United States Patent
Lie et al.

(10) Patent No.: US 8,848,771 B2
(45) Date of Patent: Sep. 30, 2014

(54) SYSTEM AND METHOD FOR SIMULTANEOUS OPERATION OF MULTIPLE MODEMS USING A SINGLE TRANSCEIVER

(75) Inventors: Gregory R. Lie, San Diego, CA (US); Reza Shahidi, San Diego, CA (US); Roland R. Rick, Superior, CO (US); Abhay A. Joshi, San Diego, CA (US); Amit Mahajan, San Diego, CA (US); Yu-Chuan Lin, Carlsbad, CA (US); Steve C. Ciccarelli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 12/779,804

(22) Filed: May 13, 2010

(65) Prior Publication Data
US 2011/0122972 A1 May 26, 2011

Related U.S. Application Data

(60) Provisional application No. 61/178,332, filed on May 14, 2009, provisional application No. 61/178,452, filed on May 14, 2009, provisional application No. 61/178,338, filed on May 14, 2009.

(51) Int. Cl.
*H04B 1/38* (2006.01)
*H04B 1/40* (2006.01)
*H04B 1/28* (2006.01)

(52) U.S. Cl.
CPC . *H04B 1/406* (2013.01); *H04B 1/28* (2013.01)
USPC ............ 375/220; 375/219; 375/259; 375/285

(58) Field of Classification Search
CPC .......... H04B 1/713; H04B 1/715; H04B 3/54; H04L 25/0266; H04L 25/4902; H04L 27/2647; H04L 7/033; H04L 5/0007; H04L 1/0618; H04L 1/06
USPC .................................. 375/259–260, 220, 285
See application file for complete search history.

(56) References Cited

U.S. PATENT DOCUMENTS 5,465,410 A 11/1995 Hiben et al.
5,590,156 A * 12/1996 Carney .......................... 375/316

(Continued)

FOREIGN PATENT DOCUMENTS

CN 1759542 A 4/2006
CN 1791276 A 6/2006

(Continued)

OTHER PUBLICATIONS

International Search Report and Written Opinion—PCT/US2010/034951, International Search Authority—European Patent Office—Oct. 25, 2010.

(Continued)

*Primary Examiner* — Sam K Ahn
*Assistant Examiner* — Janice Tieu
(74) *Attorney, Agent, or Firm* — Kevin T. Cheatham

(57) ABSTRACT

Systems and methods for simultaneously communicating over multiple air interfaces using a single transceiver are described herein. An input is received at a transceiver. The input has a first signal encoded using a first radio technology and a second signal encoded using a second radio technology. The input is converted from an analog domain to a digital domain. The input is separated into the first signal and the second signal in the digital domain.

27 Claims, 9 Drawing Sheets

(56) References Cited

U.S. PATENT DOCUMENTS

| | | | |
|---|---|---|---|
| 6,282,184 B1* | 8/2001 | Lehman et al. | 375/219 |
| 6,333,926 B1* | 12/2001 | Van Heeswyk et al. | 375/144 |
| 6,415,146 B1 | 7/2002 | Capece | |
| 6,999,759 B2 | 2/2006 | Harris et al. | |
| 7,187,923 B2 | 3/2007 | Mousseau et al. | |
| 7,426,648 B2 | 9/2008 | Lint et al. | |
| 7,885,658 B2 | 2/2011 | Jiang et al. | |
| 7,966,037 B2 | 6/2011 | Rayzman et al. | |
| 2002/0061031 A1 | 5/2002 | Sugar et al. | |
| 2002/0080728 A1 | 6/2002 | Sugar et al. | |
| 2002/0131396 A1 | 9/2002 | Knuutila et al. | |
| 2003/0054788 A1 | 3/2003 | Sugar et al. | |
| 2003/0152044 A1* | 8/2003 | Turner | 370/328 |
| 2004/0041538 A1 | 3/2004 | Sklovsky | |
| 2004/0095903 A1 | 5/2004 | Ryan et al. | |
| 2004/0203830 A1 | 10/2004 | Rudowicz et al. | |
| 2005/0003848 A1 | 1/2005 | Chen et al. | |
| 2006/0189346 A1 | 8/2006 | Turner et al. | |
| 2006/0281486 A1 | 12/2006 | Ngai et al. | |
| 2007/0041351 A1 | 2/2007 | Hazra et al. | |
| 2007/0110197 A1 | 5/2007 | Bagchi et al. | |
| 2007/0159399 A1* | 7/2007 | Perunka et al. | 343/700 MS |
| 2007/0232349 A1 | 10/2007 | Jones et al. | |
| 2008/0004063 A1 | 1/2008 | Haapoja et al. | |
| 2008/0058000 A1 | 3/2008 | Tanaka et al. | |
| 2008/0117859 A1 | 5/2008 | Shahidi et al. | |
| 2008/0151798 A1 | 6/2008 | Camp | |
| 2008/0253351 A1 | 10/2008 | Pernu et al. | |
| 2008/0259833 A1 | 10/2008 | Ozturk et al. | |
| 2008/0261540 A1 | 10/2008 | Rohani et al. | |
| 2008/0285536 A1 | 11/2008 | Kaidar et al. | |
| 2008/0311912 A1 | 12/2008 | Balasubramanian et al. | |
| 2009/0093216 A1 | 4/2009 | Sun et al. | |
| 2009/0103455 A1 | 4/2009 | Balasubramanian et al. | |
| 2010/0130252 A1 | 5/2010 | Chishima et al. | |
| 2010/0136975 A1 | 6/2010 | Onishi | |
| 2010/0291882 A1 | 11/2010 | Hu et al. | |
| 2010/0291884 A1 | 11/2010 | Hu et al. | |
| 2010/0291966 A1 | 11/2010 | Hu et al. | |

FOREIGN PATENT DOCUMENTS

| | | |
|---|---|---|
| CN | 1881821 A | 12/2006 |
| CN | 1980421 A | 6/2007 |
| CN | 101218810 A | 7/2008 |
| EP | 1727291 A2 | 11/2006 |
| FR | 2920063 | 2/2009 |
| JP | 2005012815 A | 1/2005 |
| JP | 2007274537 A | 10/2007 |
| JP | 2008061014 A | 3/2008 |
| JP | 2008136137 A | 6/2008 |
| JP | 2008172450 A | 7/2008 |
| JP | 2008244989 A | 10/2008 |
| JP | 2008252395 A | 10/2008 |
| JP | 2008545295 A | 12/2008 |
| JP | 2009005195 A | 1/2009 |
| JP | 2009060250 A | 3/2009 |
| JP | 2009065307 A | 3/2009 |
| JP | 2009532965 A | 9/2009 |
| WO | WO0051376 A1 | 8/2000 |
| WO | WO03009557 A1 | 1/2003 |
| WO | WO2006038085 | 4/2006 |
| WO | 2007113319 A1 | 10/2007 |

OTHER PUBLICATIONS

Taiwan Search Report—TW099115546—TIPO—Mar. 18, 2013.

* cited by examiner

SYSTEM AND METHOD FOR SIMULTANEOUS OPERATION OF MULTIPLE MODEMS USING A SINGLE TRANSCEIVER

CROSS-REFERENCE TO RELATED APPLICATIONS

This application claims priority under §119(e) to the following U.S. Provisional Applications: (1) U.S. Prov. App. No. 61/178,332, entitled "System and method for resolving conflicts between air interfaces in a wireless communication system," filed May 14, 2009; (2) U.S. Prov. App. No. 61/178,452, entitled "Allocating transmit power among multiple air interfaces," filed May 14, 2009; and (3) U.S. Prov. Appl. No. 61/178,338, entitled "System and method for dropping and adding an air interface in a wireless communication system," filed May 14, 2009. The above-referenced applications are herein incorporated by reference in their entirety.

BACKGROUND

1. Field

This application relates generally to communication, and more specifically, to a receiver for a wireless communication system.

2. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

Current wireless communication systems are not optimized to communicate over multiple air interfaces (e.g., 1x, 1xAdvanced, DO, UMTS (HSPA+), GSM, GPRS, EDGE, etc.) concurrently. Thus, a need exists for wireless communication systems able to concurrently communicate over multiple air interfaces efficiently.

SUMMARY

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include concurrent communication over multiple air interfaces.

One aspect of the disclosure is a method of receiving a first input during a first time period, the first input comprising a first signal and a second signal, wherein the first signal is encoded using a first radio technology and the second signal is encoded using a second radio technology; converting the first input from an analog domain to a digital domain; and separating the first input into the first signal and the second signal in the digital domain.

Another aspect of this disclosure is a method of combining a first signal and a second signal wherein the first signal is encoded using a first radio technology and the second signal is encoded using a second radio technology, converting the combined signal from a digital domain to an analog domain, and transmitting the combined signal.

Another aspect of this disclosure is a wireless apparatus comprising an antenna configured to receive a first input during a first time period, the first input comprising a first signal and a second signal, wherein the first signal is encoded using a first radio technology and the second signal is encoded using a second radio technology; an analog-to-digital converter configured to convert the first input from an analog domain to a digital domain; and at least one rotator configured to separate the first input into the first signal and the second signal in the digital domain.

Another aspect of this disclosure is a wireless apparatus comprising a summer configured to combine a first signal and a second signal wherein the first signal is encoded using a first radio technology and the second signal is encoded using a second radio technology, a digital-to-analog converter configured to convert the combined signal from a digital domain to an analog domain, and an antenna configured to transmit the combined signal.

Another aspect of this disclosure is a wireless apparatus comprising means for receiving a first input during a first time period, the first input comprising a first signal and a second signal, wherein the first signal is encoded using a first radio technology and the second signal is encoded using a second radio technology; means for converting the first input from an analog domain to a digital domain; and means for separating the first input into the first signal and the second signal in the digital domain.

Another aspect of this disclosure is a wireless apparatus comprising means for combining a first signal and a second signal wherein the first signal is encoded using a first radio technology and the second signal is encoded using a second radio technology, means for converting the combined signal from a digital domain to an analog domain, and means for transmitting the combined signal.

Another aspect of this disclosure is a computer program product, comprising computer-readable medium comprising code for causing a computer to receive a first input during a first time period, the first input comprising a first signal and a second signal, wherein the first signal is encoded using a first radio technology and the second signal is encoded using a second radio technology; code for causing a computer to convert the first input from an analog domain to a digital domain; and code for causing a computer to separate the first input into the first signal and the second signal in the digital domain.

Another aspect of this disclosure is a computer program product, comprising computer-readable medium comprising code for causing a computer to combine a first signal and a second signal wherein the first signal is encoded using a first radio technology and the second signal is encoded using a second radio technology, code for causing a computer to convert the combined signal from a digital domain to an analog domain, and code for causing a computer to transmit the combined signal.

DETAILED DESCRIPTION

Figure 1:
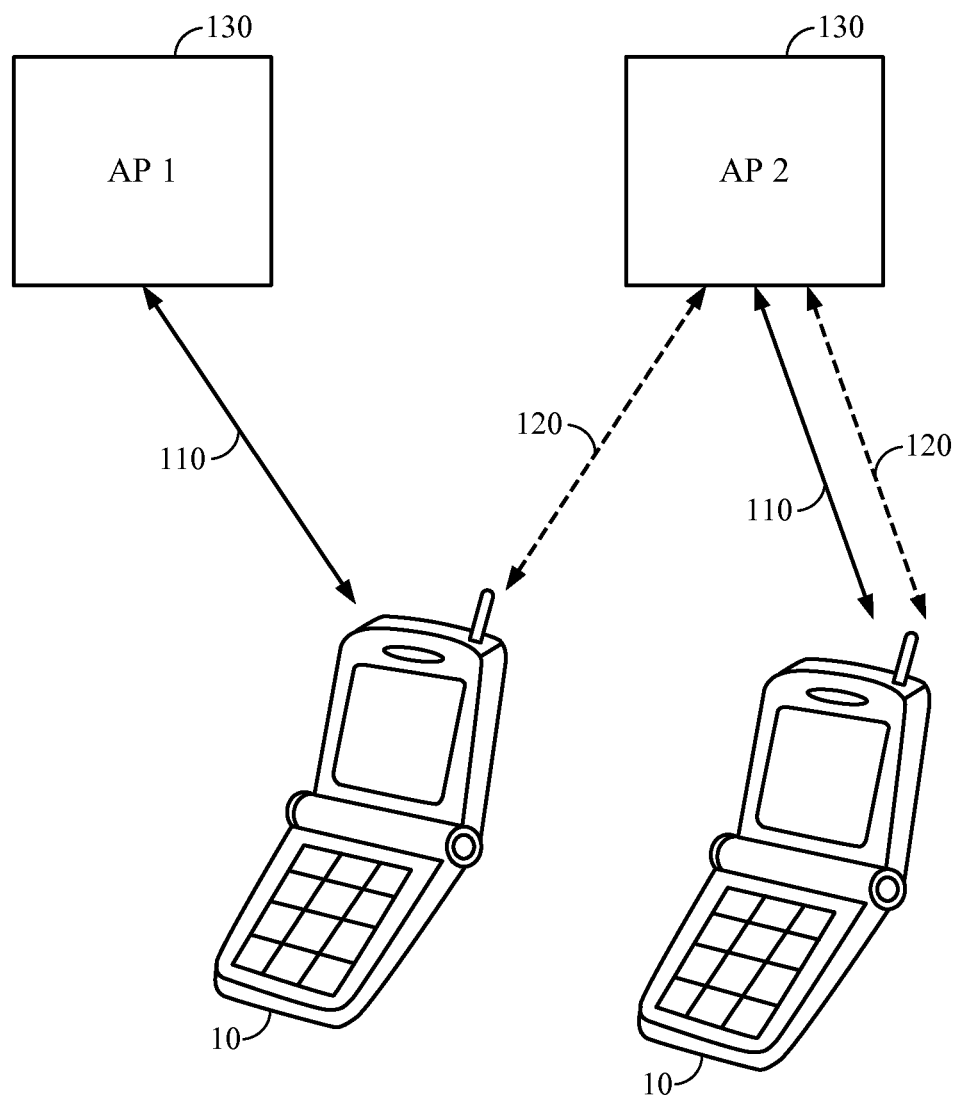
FIG. 1 is a diagram illustrating wireless communication devices engaged in simultaneous communication over two air interfaces.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. The following are examples of distinct radio technologies that may be used with the methods and devices described herein: various Universal Terrestrial Radio Access (UTRA) radio technologies, various cdma2000 radio technologies, Wideband-CDMA (W-CDMA), Low Chip Rate (LCR), IS-2000, IS-95, IS-856, Global System for Mobile Communications (GSM), Evolved UTRA (E-UTRA), IEEE 802.11, IEEE 802.16, IEEE 802.20, Flash-OFDM, Long Term Evolution (LTE) etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Methods and devices are described herein relating to simultaneous communication over multiple air interfaces (e.g., multiple radio technologies each using a different standard, packet format, and/or modulation scheme). For example, a wireless communication device may communicate voice over a first air interface (e.g., 1xRTT) and data only over a second air interface (e.g., EVDO, 1xAdvanced, DO (Release 0, Revision A or B), UMTS (HSPA+), GSM, GPRS, and EDGE technologies). 1xRTT, also known as 1x, 1xRTT, and IS-2000, is an abbreviation of 1 times Radio Transmission Technology. EVDO, abbreviated as EV or DO, is an abbreviation of Evolution-Data Only. Both 1xRTT and EVDO are telecommunications standards for the wireless transmission of data through radio signals maintained by 3GPP2 ($3^{rd}$ Generation Partnership Project), which are considered types of CDMA2000 (Code Division Multiple Access 2000).

For clarity, certain aspects of the methods and devices are described for an HRPD system that implements IS-856. HRPD is also referred to as CDMA2000 1xEVDO (Evolution-Data Optimized), 1xEV-DO, 1x-DO, DO, High Data Rate (HDR), etc. The terms "HRPD", "EV-DO", and "DO" are often used interchangeably. HRPD is described in 3GPP2 C.S0024-B, entitled "cdma2000 High Rate Packet Data Air Interface Specification," dated March 2007, which is publicly available. For clarity, HRPD terminology is used in much of the description below.

The methods and devices described herein may be used for an access terminal as well as an access point. An access point is generally a fixed station that communicates with the access terminals and may also be referred to as a base station, a Node B, etc. An access terminal may be stationary or mobile and may also be referred to as a mobile station, a user equipment (UE), a mobile equipment, a terminal, a subscriber unit, a station, etc. An access terminal may be a cellular phone, a personal digital assistant (PDA), a handset, a wireless communication device, a handheld device, a wireless modem, a laptop computer, etc. For clarity, the use of the methods and devices for an access terminal is described below.

The methods and devices herein correspond to the reception and transmission of one or multiple signals simultaneously. Each signal may be transmitted using on a different channel using one or more air interfaces. A channel is a frequency channel for one signal. A channel is also commonly referred to as a carrier.

FIG. 1 is a diagram illustrating wireless communication devices engaged in simultaneous communication over two air interfaces. Each wireless communication device 10 can simultaneously establish a first air interface 110 and a second air interface 120 between itself and one or more access points 130. In one embodiment, the first air interface 110 is established at a first channel defined by a first frequency or frequency band, whereas the second air interface 120 is established at a second channel defined by a second frequency or frequency band which is different from the first frequency or frequency band.

In one embodiment, the first air interface 110 supports 1xRTT traffic and the second air interface 120 supports EVDO traffic. In other embodiments, the first air interface 110 or the second air interface 120 can support 1xAdvanced, DO (Release 0, Revision A or B), UMTS (HSPA+), GSM, GPRS, and EDGE technologies.

Figure 2:
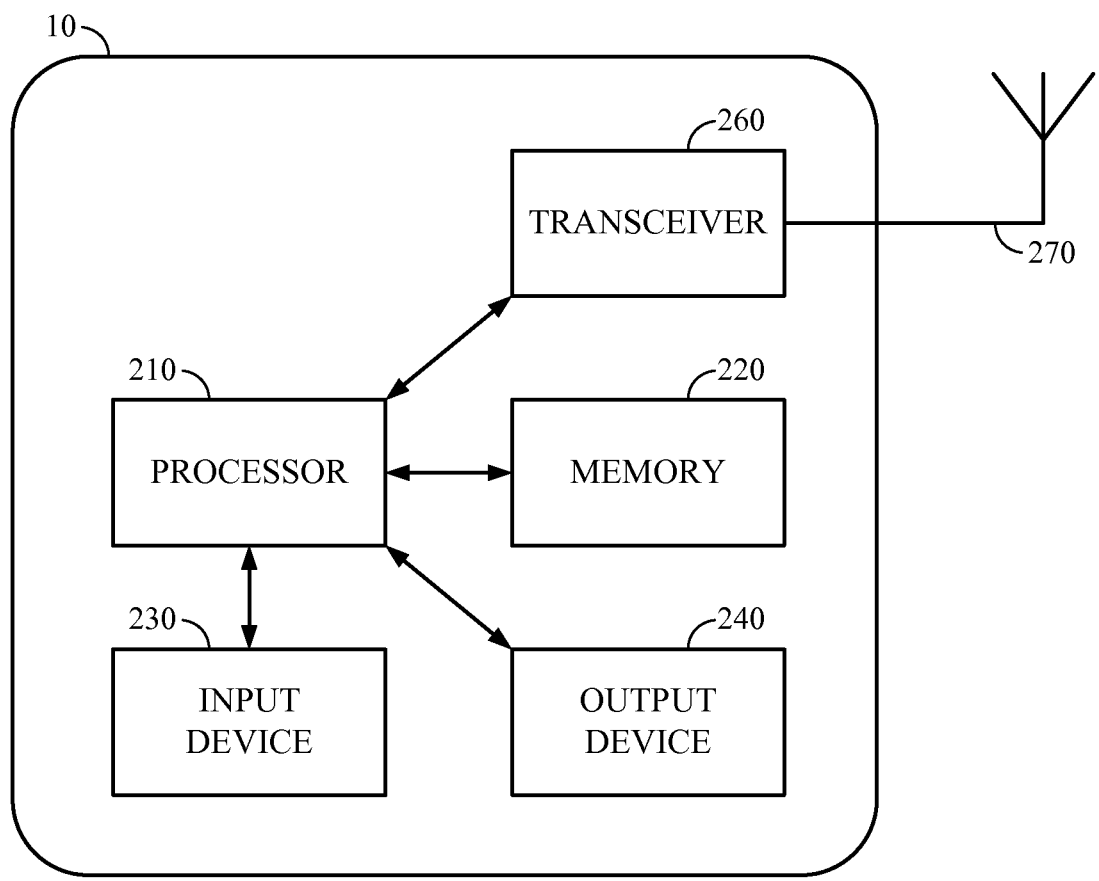
FIG. 2 is a functional block diagram of a wireless communication device.

FIG. 2 is a functional block diagram of a wireless communication device. The wireless communication device 10 includes a processor 210 in data communication with a memory 220, an input device 230, and an output device 240. The processor is further in data communication with a transceiver 260. The transceiver 260 is also in data communication with an antenna 270. Although described separately, it is to be appreciated that functional blocks described with respect to the wireless communication device 10 need not be separate structural elements. For example, the processor 210 and memory 220 may be embodied in a single chip. Similarly, two or more of the processor 210, and transceiver 260 may be embodied in a single chip.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 can be coupled, via one or more buses, to read information from or write information to memory 220. The processor may additionally, or in the alternative, contain memory, such as processor registers. The memory 220 can include processor cache, including a multi-level hierarchical cache in which different levels have different capacities and access speeds. The memory 220 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 210 is also coupled to an input device 230 and an output device 240 for, respectively, receiving input from and providing output to, a user of the wireless communication device 10. Suitable input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, and haptic output devices, including force-feedback game controllers and vibrating devices.

The processor 210 is further coupled to a transceiver 260. The transceiver 260 may comprise one or more modems. The transceiver 260 prepares data generated by the processor 210 for wireless transmission via the antenna 270 according to one or more air interface standards. The transceiver 260 also demodulates data received via the antenna 270 according to one or more air interface standards. The transceiver can include a transmitter, receiver, or both. In other embodiments, the transmitter and receiver are two separate components. The transceiver 260, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

It may be desirable to support transmission and/or reception of one or more signals sent over multiple channels using as little circuitry as possible in order to reduce cost, lower power consumption, improve reliability, and obtain other benefits. Accordingly, embodiments of receivers and transmitters are described herein that employ a single RF receive chain and a single RF transmit chain, respectively. Each RF chain may be wideband and designed for transmission and reception, respectively, of multiple signals over multiple channels using one or more air interfaces.

Figure 3:
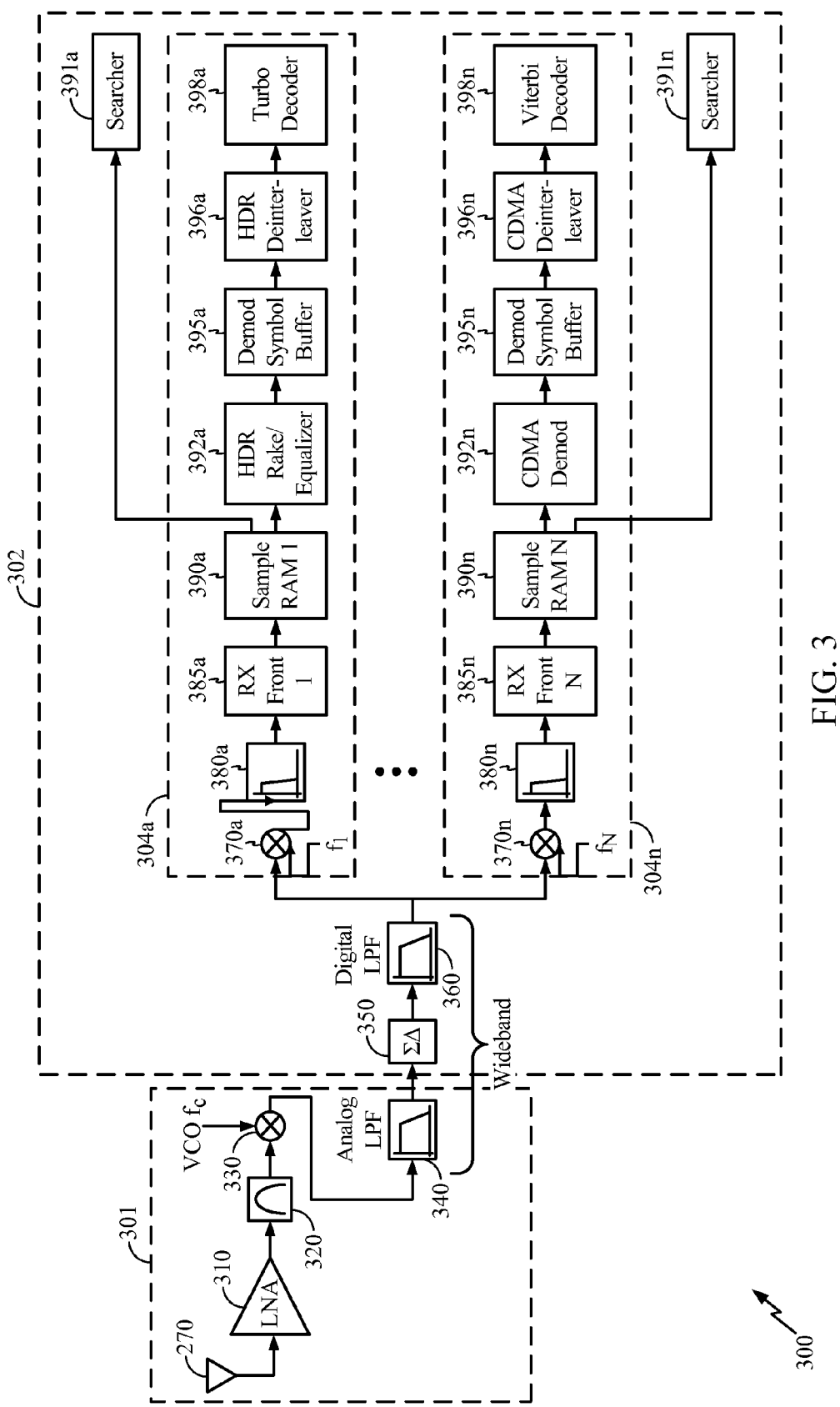
FIG. 3 is a functional block diagram of an exemplary receiver of a wireless communication device as shown in FIG. 2.

FIG. 3 is a functional block diagram of an exemplary receiver 300 of a wireless communication device. FIG. 3 illustrates exemplary components which may be embodied in the transceiver 260 of FIG. 2. The receiver 300 may be configured to receive signals over a configurable frequency range as discussed below. The receiver 300 includes a single RF receive chain 301 and a digital section 302. The digital section 302 is divided into N digital process chains 304. Each digital process chain may correspond to a decoding path for a signal sent using a particular type of air interface. Each air interface may use a different coding scheme and therefore require different decoding hardware to decode the signal. Two exemplary paths are described, however, other similar paths may also be provided in addition to or in place of the described paths. The first path 304$a$ corresponds to the demodulation path for a high data rate signal, such as a DO signal. The second path 304$n$ corresponds to the demodulation path for a voice signal, such as a 1xRTT signal.

The single RF receive chain 301 is configured to receive a signal comprising multiple signals sent over multiple air interfaces. Accordingly, instead of requiring multiple copies of each component in the RF receive chain to receive multiple signals over multiple air interfaces, only a single copy of each component is needed. Further, components of the digital section 302 may also be shared to process multiple signal received over multiple air interfaces. For example, a single analog-to-digital converter and a single digital low-pass filter may be used for processing the multiple signals. This may reduce cost and/or complexity of the transceiver 260.

The RF receive chain 301 may implement a super-heterodyne architecture or a direct-conversion architecture. In the super-heterodyne architecture, a received RF signal is frequency downconverted in multiple stages, e.g., from RF to an intermediate frequency (IF) in one stage, and then from IF to baseband in another stage. In the direct-conversion architecture, which is also referred to as a zero-IF architecture, the received RF signal is frequency downconverted from RF directly to baseband in one stage. The super-heterodyne and direct-conversion architectures may use different circuit blocks and/or have different circuit requirements. The following description assumes the use of the direct-conversion architecture.

A signal is received on the antenna 270 and passed to the RF receive chain 301. The received signal may comprise multiple signals sent over multiple air interfaces. Within RF receive chain 301, a low noise amplifier (LNA) 310 may receive and amplify the received signal with a gain $G_{LNA}$ and provide an amplified RF signal. The gain $G_{LNA}$ be calculated based on the received signal strength (Rx Automatic Gain Control (AGC) measured in dB) of each of the multiple signals of the received signal. For example, the Rx AGC of a signal may be below a threshold value. The threshold value may be a value sufficient to allow the signal to be processed. If the Rx AGC of the signal is too low, the $G_{LNA}$ may be increased. In one embodiment, since only one LNA applies the same $G_{LNA}$ to multiple signals, the $G_{LNA}$ is based on the weakest signal to make sure the Rx AGC is sufficient for all the signals. In another embodiment, the $G_{LNA}$ may be based on the weakest signal as well as additional criteria. For example, the receiver 300 may determine if one signal has a signal strength that, if amplified by $G_{LNA}$ based on the weakest signal, would saturate an analog-to-digital converter (ADC) 350 of the receiver 300 (i.e., the signal exceeds the input range of the ADC 350). In order to avoid saturation, the $G_{LNA}$ may be based on another received signal, and the weakest signal may be dropped (e.g., the frequency range that is received may be configured to a range that does not include the weakest signal) or go unused. The Rx AGC may be measured for each of the multiple signals using the digital section 302 as discussed below.

A bandpass filter 320 may filter the signal from LNA 310 to remove out-of-band signal components and provide an input RF signal. Bandpass filter 320 may be a surface acoustic wave (SAW) filter, a ceramic filter, or some other type of filter. A mixer 330 may frequency downconvert the input RF signal from RF to baseband with an analog local oscillator (LO) signal of a frequency $f_c$ from an LO generator. The LO generator may include a voltage controlled oscillator (VCO), a phase locked loop (PLL), a reference oscillator, etc. Optionally, a variable gain amplifier (VGA) may amplify the downconverted signal from mixer 330 with a gain $G_{VGA}$. Optionally, a summer may add a coarse DC offset estimate to remove DC offset in the amplified signal from the VGA. An analog lowpass filter 340 may filter the signal and provide an analog baseband signal to digital section 302.

Within digital section 302, an analog-to-digital converter (ADC) 350 may digitize the analog baseband signal at a sampling rate of f.sub.ADC and provide one or more sample streams. The ADC sampling rate may be fixed and selected based on the number and types of air interfaces that can be received simultaneously. Alternatively, the ADC sampling rate may be configurable and selected based on the number and types of air interfaces being received. Optionally, a preprocessor may perform pre-processing on the one or more sample streams from ADC 350. The sample streams may then be sent to a digital filter 360. Digital filter 360 may filter the sample stream to remove undesired signal components. The sample stream may then be provided to each of the N digital process chains 304a to 304n. Digital process chains 304a and 304n are described below. The sample stream may comprise data sent using multiple air interfaces.

Digital process chain 304a receives the sample stream, which may comprise a first signal sent using a first air interface and one or more additional signals. A rotator 370a may operate as a digital downcoverter, frequency downconvert the input sample stream with a digital LO signal, and provide a down converted sample stream of a first signal sent using a first air interface. The rotator 370a may multiply the input sample stream by a center frequency $f_1$, which is the center frequency channel over which the first signal was transmitted. A digital filter 380a may filter the downconverted sample stream to remove images caused by the digital downconversion and other undesired signal components.

The filtered signal may be sent to a receiver front end 385a, which processes the incoming signal. The front end 385a may measure the Rx AGC of the signal. As discussed above, the Rx AGC of the signal may be used to control the gain $G_{LNA}$ of the LNA 310. The Rx AGC may also be used to determine whether to add or drop frequencies at which signals are received. For example, if the total power within the frequency range currently received saturates the ADC 350 (i.e., the received signal exceeds the input range of the ADC 350), some signals may be dropped. Signals may be dropped, for example, by configuring the frequency range (e.g., by reducing the range or shifting the range) to not include some of the signals that saturate the ADC 350. For example, some signals may be preferred over other signals (e.g., voice signals may be preferred over data signals) and therefore non preferred signals may be dropped first when determining which signals to drop. Further, the front end 385a may scale the filtered samples to obtain the desired amplitude and provide an output sample stream to a sample random access memory (RAM) 390a, which temporarily stores the sample stream.

The sample stream may be accessed from sample RAM 390a by a searcher 391a. The searcher 391a may be configured to search the sample stream for pilot signals received over the center frequency $f_1$. The pilot signals may be sent by other communication devices such as access points. A pilot signal may comprise a known reference signal for determining the strength of signals received from an access point. The known reference signal may be compared to the received reference signal to determine signal quality. The strength of signals received from the access point may comprise an $E_{cp}/I_o$ ratio (energy of the pilot signal to energy of interfering signals ratio) or a signal-to-noise ratio. The pilot signal may also comprise an offset pseudo noise (PN) short code. The offset PN short code may comprise a code or sequence of numbers that identifies the access point and/or the access point type (e.g., femto, macro, pico). The offset PN short code may comprise a PN short code with a PN offset applied. The PN offset may indicate the delay from the true network synchronization time applied to a PN short code. In one embodiment, all of the access points may use the same PN short code. However, a different PN offset may be applied to the PN short code for different access points. Thus, the PN offset directly correlates to the offset PN short code and the terms "PN offset" and "offset PN short code" may be used interchangeably herein. Accordingly, by identifying pilot signals with different PN offsets in the sample stream, the searcher 391a may identify additional access points transmitting over the center frequency $f_1$.

The sample stream may also be accessed from sample RAM 390a by a rake/equalizer receiver 392 comprising a rake receiver and/or an equalizer receiver. The rake/equalizer receiver 392 processes the signal. A rake receiver may be selected for some operating scenarios (e.g., low SNR) and an equalizer receiver may be selected for other operating scenarios (e.g., high SNR and/or high data rate). In general, either a rake receiver or an equalizer receiver may be selected depending on which receiver can provide better performance. The signal is then sent to a demodulation symbol buffer 395a, to buffer the signal for further processing. The signal is accessed from the buffer by a deinterleaver 396a, which may deinterleave (or reorder) the symbol estimates in a manner complementary to the interleaving performed by the transmitter that sent the signal. A decoder 398a (e.g., a turbo decoder) may decode the deinterleaved symbol estimates and provide decoded data.

Digital process chain 304n receives the sample stream, which may comprise a second signal sent using a second air interface and one or more additional signals. A rotator 370n may operate as a digital downcoverter, frequency downconvert the input sample stream with a digital LO signal, and provide a down converted sample stream of a second signal sent using a second air interface. The rotator 370n may multiply the input sample stream by a center frequency $f_n$, which is the center frequency channel over which the second signal was transmitted. A digital filter 380n may filter the downconverted sample stream to remove images caused by the digital downconversion and other undesired signal components.

The filtered signal may be sent to a receiver front end 385n, which processes the incoming signal. The front end 385n may measure the Rx AGC of the signal. As discussed above, the Rx AGC of the signal may be used to control the gain $G_{LNA}$ of the LNA 310. Further, the front end 385n may scale the filtered samples to obtain the desired amplitude and provide an output sample stream to a sample random access memory (RAM) 390n, which temporarily stores the sample stream.

The sample stream may be accessed from sample RAM 390n by a searcher 391n. The searcher 391n may be configured to search the sample stream for pilot signals received over the center frequency $f_n$. By identifying pilot signals with different PN offsets in the sample stream, the searcher 391n may identify additional access points transmitting over the center frequency $f_n$.

The sample stream may also be accessed from sample RAM 390n by a CDMA demodulator 393. The CDMA demodulator 393 demodulates the incoming CDMA stream into symbols as is known in the art. The signal is then sent to a demodulation symbol buffer 395n, to buffer the signal for further processing. The signal is accessed from the buffer by a deinterleaver 396n, which may deinterleave (or reorder) the symbol estimates in a manner complementary to the interleaving performed by the transmitter that sent the signal. A decoder 398n (e.g., a viterbi decoder) may decode the deinterleaved symbol estimates and provide decoded data. In general, the processing by receiver 300 for each received signal is dependent on the processing performed for the received signal by the transmitter or access point. Receiver 300 may be used in conjunction with one or more transmitters that can transmit using one or more air interfaces.

ADC 350 may be implemented with a delta-sigma ($\Delta\Sigma$) ADC that can spectrally shape quantization noise such that the noise is pushed from low frequencies toward higher frequencies. This noise shaping may allow the received signals to observe less quantization noise inband and hence achieve higher signal-to-noise ratios (SNRs). The out-of-band quantization noise may be more easily filtered by subsequent digital filters. The noise spectrum of the $\Delta\Sigma$ ADC may be determined by an oversampling ratio (OSR), which is the ratio of the sampling rate of the $\Delta\Sigma$ ADC to the two-sided bandwidth of the received signals being digitized. In general, a higher sampling rate may push the quantization noise higher in frequency, increase the bandwidth of the $\Delta\Sigma$ ADC, and improve SNR. However, the higher sampling rate may also result in higher power consumption. The sampling rate may be varied based on various factors such as the number of signals being received, the operating conditions (e.g., the desired signal level and undesired signal level), power consumption consideration, etc.

The $\Delta\Sigma$ ADC may use a reference voltage $V_{ref}$ for making approximations of changes in the analog baseband signal amplitude. This $V_{ref}$ voltage may determine the maximum signal level that can be captured by the $\Delta\Sigma$ ADC without clipping, which is often called the full-scale level. The $V_{ref}$ voltage may also determine the quantization noise, which is typically given relative to the $V_{ref}$ voltage. The $V_{ref}$ voltage may be varied based on various factors such as the number of signals being received, the signal level, the undesired signal level, etc. For example, the $V_{ref}$ voltage may be reduced when receiving multiple signals, when the signal level is low, etc. The lower $V_{ref}$ voltage may lower the quantization noise level and improve SNR for the scenarios described above. However, the noise floor of the $\Delta\Sigma$ ADC may come into play and become the limiting factor as the quantization noise level is dropped.

In general, wider bandwidth may be achieved for the $\Delta\Sigma$ ADC by increasing the sampling rate and/or lowering the $V_{ref}$ voltage. The wider bandwidth may accommodate reception of multiple signals simultaneously.

Rake/equalizer receiver 392 may comprise a rake receiver and/or an equalizer receiver. The rake receiver may process the output sample stream for a first signal for one or more signal paths (or multipaths) detected for the first signal. The rake receiver may perform various functions such as despreading with a complex pseudo-random number (PN) sequence used by an access point, decovering with Walsh codes used for data, pilot and overhead channels, pilot estimation, coherent demodulation of the decovered symbols with pilot estimates, symbol combining across the multipaths, etc. The equalizer receiver may process the output sample stream for the first signal. The dqualizer receiver may perform various functions such as pilot estimation, derivation/adaptation of filter coefficients, filtering of the output samples with the filter coefficients, despreading with the complex PN sequence, decovering with the Walsh codes, symbol scaling, etc.

FIG. 3 illustrates one embodiment of the RF receive chain 301. In general, an RF receive chain may include one or more stages of amplifier, filter, mixer, etc. These circuit blocks may be arranged differently from the configuration shown in FIG. 3. An RF receive chain may also include different and/or additional circuit blocks not shown in FIG. 3. All or a portion of RF receive chain 301 may be implemented on one or more RF integrated circuits (RFICs), mixed-signal ICs, etc. For example, LNA 310, mixer 330, and analog lowpass filter 340 may be implemented on an RFIC, e.g., an RF receiver (RFR) or an RF transmitter/receiver (RTR) chip.

Although described separately, it is to be appreciated that functional blocks described with respect to the receiver 300 need not be separate structural elements. For example, one or more components may be embodied in a single chip. One or more of the functional blocks and/or one or more combinations of the functional blocks described with respect to the receiver 300 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the receiver 300 may also be implemented as a combination of computing devices, e.g., a combination of a DSP and a microprocessor, a plurality of microprocessors, one or more microprocessors in conjunction with a DSP communication, or any other such configuration.

Figure 4:
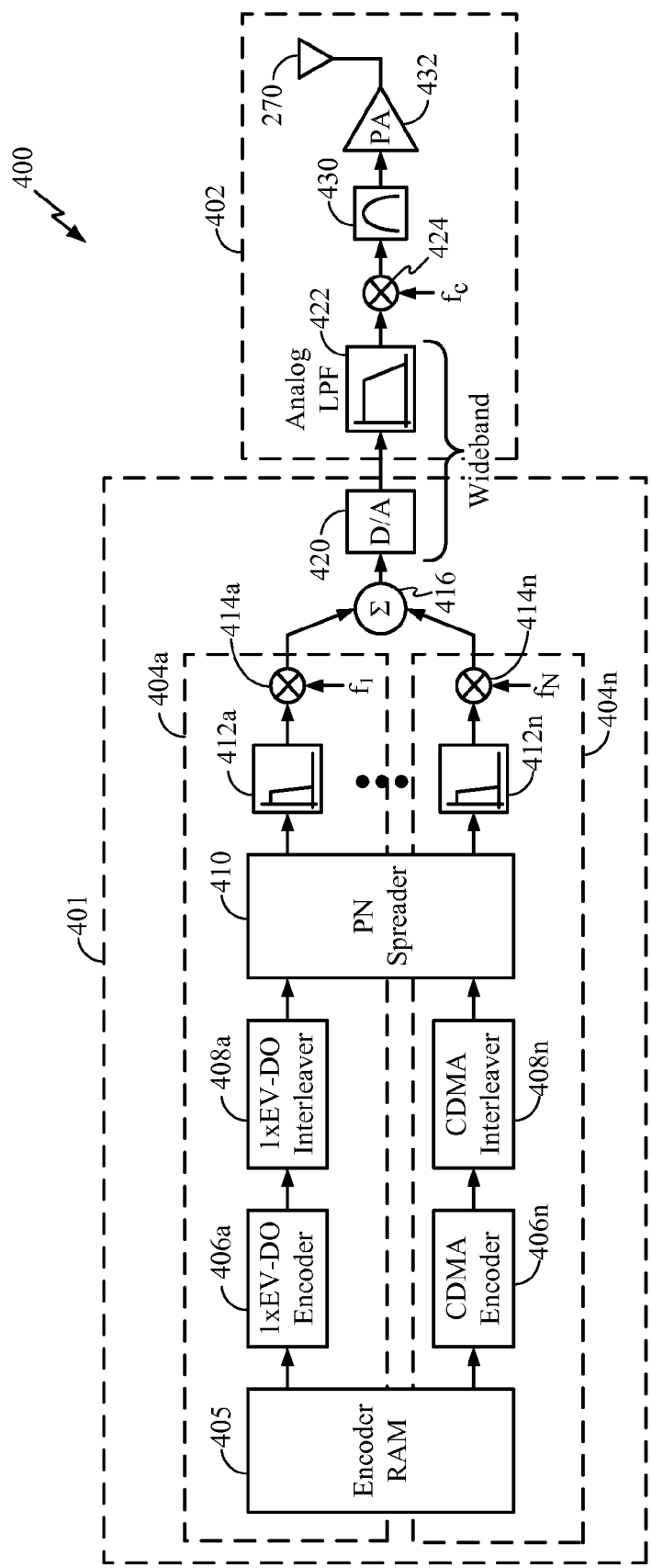
FIG. 4 is a functional block diagram of an exemplary transmitter of a wireless communication device as shown in FIG. 2.

FIG. 4 is a functional block diagram of an exemplary transmitter 400 of a wireless communication device. FIG. 4 illustrates exemplary components which may be embodied in the transceiver 260 of FIG. 2. The function of the transmitter is similar to that of the receiver, but in reverse. The transmitter 400 includes a digital section 401 and a RF transmit chain 402. The digital section 401 is divided into N digital process chains 404. Each digital process chain may correspond to an encoding path for a signal to be transmitted using a particular type of air interface. Each air interface may use a different coding scheme and therefore require different encoding hardware to encode the signal. Two exemplary paths are described, however, other similar paths may also be provided in addition to or in place of the described paths. The first path 404a corresponds to the encoding path for a high data rate signal, such as a DO signal. The second path 404n corresponds to the encoding path for a voice signal, such as a 1xRTT signal.

The single RF transmit chain 402 is configured to transmit a signal comprising multiple signals sent over multiple air interfaces. Accordingly, instead of requiring multiple copies of each component in the RF transmit chain to receive multiple signals over multiple air interfaces, only a single copy of each component is needed. Further, components of the digital section 401 may also be shared to process multiple signal received over multiple air interfaces. For example, a single digital-to-analog converter, a single encoder RAM, and a single PN spreader may be used for processing the multiple signals. This may reduce cost and/or complexity of the transceiver 260.

Within digital section 401, an encoder random access memory (RAM) 405 holds the digital data to be encoded and transmitted. The first path 404a may include an DO encoder 406a that encodes a first set of data into DO symbols. The encoded data is then passed to a DO interleaver 408a, which orders the symbols by methods known in the art. Similarly, the second path 404n may include a CDMA encoder 406n that encodes a second set of data into CDMA symbols. The encoded data is then passed to a CDMA interleaver 408n, which orders the symbols by methods known in the art. Both the data streams are then passed to a pseudo noise (PN) spreader 410. PN spreader spreads each of the input sequences in accordance with one or more PN sequences as known in the art. The PN spreader provides the first set of encoded data to the digital filter 412a and the second set of encoded data to the digital filter 412n. Each digital filter 412 may filter its input symbols, perform upsampling, and provide a filtered sample stream to a rotator 414. Each rotator 414 operates as a digital upconverter, frequency upconverts its filtered sample stream with a digital local oscillator (LO) signal, and provided an upconverted sample stream. Each rotator 414 may multiply the input sample stream by a center frequency $f_1$ to $f_n$. For example, the first set of encoded data may be multiplied by a frequency $f_1$ and the second set of encoded data may be multiplied by a frequency $f_n$. The frequency may be determined by the air interface and/or the carrier frequency that is used to transmit the signal. Each signal is then input to a summer 416 that sums the N upconverted sample streams from each rotator 414. The summed signal is then passed to a digital-to-analog converter (DAC) 420, which converts the sample stream to analog and provided an analog baseband signal comprising the N signals. The analog baseband signal is then sent to the RF transmit chain 402.

The RF transmit chain 402 may implement a super-heterodyne architecture or a direct-conversion architecture. In the super-heterodyne architecture, a baseband signal is frequency upconverted in multiple stages, e.g., from baseband to an intermediate frequency (IF) in one stage, and then from IF to RF in another stage. In the directconversion architecture, which is also referred to as a zero-IF architecture, the baseband signal is frequency upconverted from baseband directly to RF in one stage. The superheterodyne and direct-conversion architectures may use different circuit blocks and/or have different circuit requirements. The following description assumes the use of the direct-conversion architecture.

Within RF transmit chain 402, an analog lowpass filter 422 filters the analog baseband signal from DAC 420 to remove images caused by the digital-to-analog conversion and provides a filtered signal. A mixer 424 frequency upconverts the filtered signal from baseband to RF with an analog LO signal from an LO generator. The LO generator may include a voltage controlled oscillator (VCO), a phase locked loop (PLL), a reference oscillator, etc. Optionally, a variable gain amplifier (VGA) amplifies the upconverted signal from mixer 424 with a variable gain. A bandpass filter 430 filters the signal to remove images caused by the frequency upconversion. Bandpass filter 430 may be a surface acoustic wave (SAW) filter, a ceramic filter, or some other type of filter. A power amplifier (PA) 432 amplifies the signal from filter 430 and provides an RF output signal having the proper power level. The RF output signal is transmitted via the antenna 270.

DAC 420 and RF transmit chain 402 may be wideband to support simultaneous transmission of multiple signals using multiple air interfaces. DAC 420 may be operated at a sufficiently high clock rate and may have sufficient resolution for conversion of a digital sample stream containing all N signals. Analog lowpass filter 422 may have a fixed or variable bandwidth that may be sufficiently wide to pass all of the signals being sent simultaneously. The subsequent analog circuit blocks may also be wideband to pass all of the signals. Bandpass filter 430 may be wideband and may pass an entire frequency band, e.g., from 824 to 849 MHz for cellular band and from 1850 to 1910 MHz for Personal Communications Service (PCS) band.

FIG. 4 illustrates one embodiment of RF transmit chain 402. In general, an RF transmit chain may include one or more stages of amplifier, filter, mixer, etc. These circuit blocks may be arranged differently from the configuration shown in FIG. 4. An RF transmit chain may also include different and/or additional circuit blocks not shown in FIG. 4. All or a portion of RF transmit chain 402 may be implemented on one or more RF integrated circuits (RFICs), mixed-signal ICs, etc. For example, analog lowpass filter 422 and mixer 424 may be implemented on an RFIC, e.g., an RF transmitter (RFT) or an RF transmitter/receiver (RTR) chip.

Although described separately, it is to be appreciated that functional blocks described with respect to the transmitter 400 need not be separate structural elements. For example, one or more components may be embodied in a single chip. One or more of the functional blocks and/or one or more combinations of the functional blocks described with respect to the transmitter 400 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the transmitter 400 may also be implemented as a combination of computing devices, e.g., a combination of a DSP and a microprocessor, a plurality of microprocessors, one or more microprocessors in conjunction with a DSP communication, or any other such configuration.

The embodiments of transceiver 260 as shown in FIGS. 3 and 4 allow for many components to be shared for the processing of multiple signals received and/or transmitted over multiple air interfaces. Accordingly, the cost of producing transceivers that communicate over multiple air interfaces such as transceiver 260 may be reduced as fewer components are necessary. This may also decrease complexity and power consumption of the transceiver 260.

Figure 5:
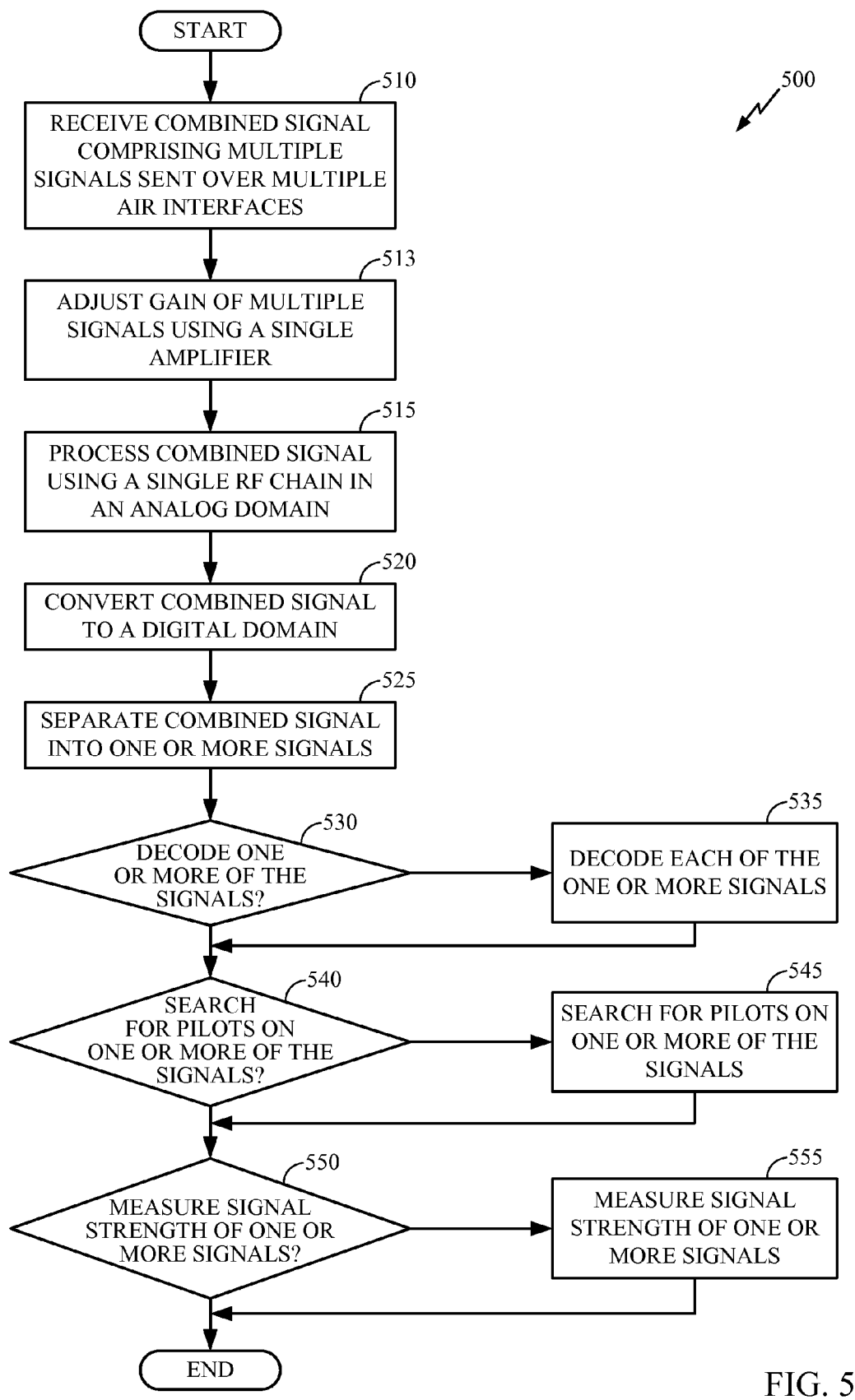
FIG. 5 illustrates an exemplary process of receiving signals over multiple air interfaces using the receiver as shown in FIG. 3.

FIG. 5 illustrates an exemplary process of receiving signals over multiple air interfaces using a receiver as shown in FIG. 3. The process 500 starts at a step 510 where the receiver receives a combined signal comprising multiple signals sent over multiple air interfaces. The process continues to a step 513 where the gain of the combined signal comprising the multiple signals is adjusted using a single amplifier. In one embodiment, the gain may be adjusted based on the weakest of the multiple signals as discussed above. Further, the gain may be adjusted based on certain rules such as not amplifying the combined signal to a level that would saturate an ADC of the receiver. Next at a step 515, the combined signal is processed by a single RF chain in the analog domain. Further at a step 520, the combined signal is converted to the digital domain by a single ADC. Continuing at a step 525, the combined signal is separated into one or more signals; each signal representing a signal sent using a particular air interface.

Next, at a step 530 the receiver determines whether to decode one or more of the signals. If the receiver determines to decode one or more of the signals, the process 500 continues to step 535 where each of the one or more signals that is to be decoded is decoded using a different digital process chain. Continuing at a step 540, the receiver determines whether to search for pilot signals on one or more of the signals. If the receiver determines to search for pilot signals on one or more of the signals, the process continues to step 545 where each of the one or more signals that is to be searched is searched using a different searcher of a different digital process chain. Further at a step 550, the receiver determines whether to measure the Rx AGC of one or more of the signals. If the receiver determines to measure the Rx AGC of one or more of the signals, the process 500 continues to step 555 where each of the one or more signals for which the Rx AGC is to be measured is measured using a different digital process chain.

Figure 6:
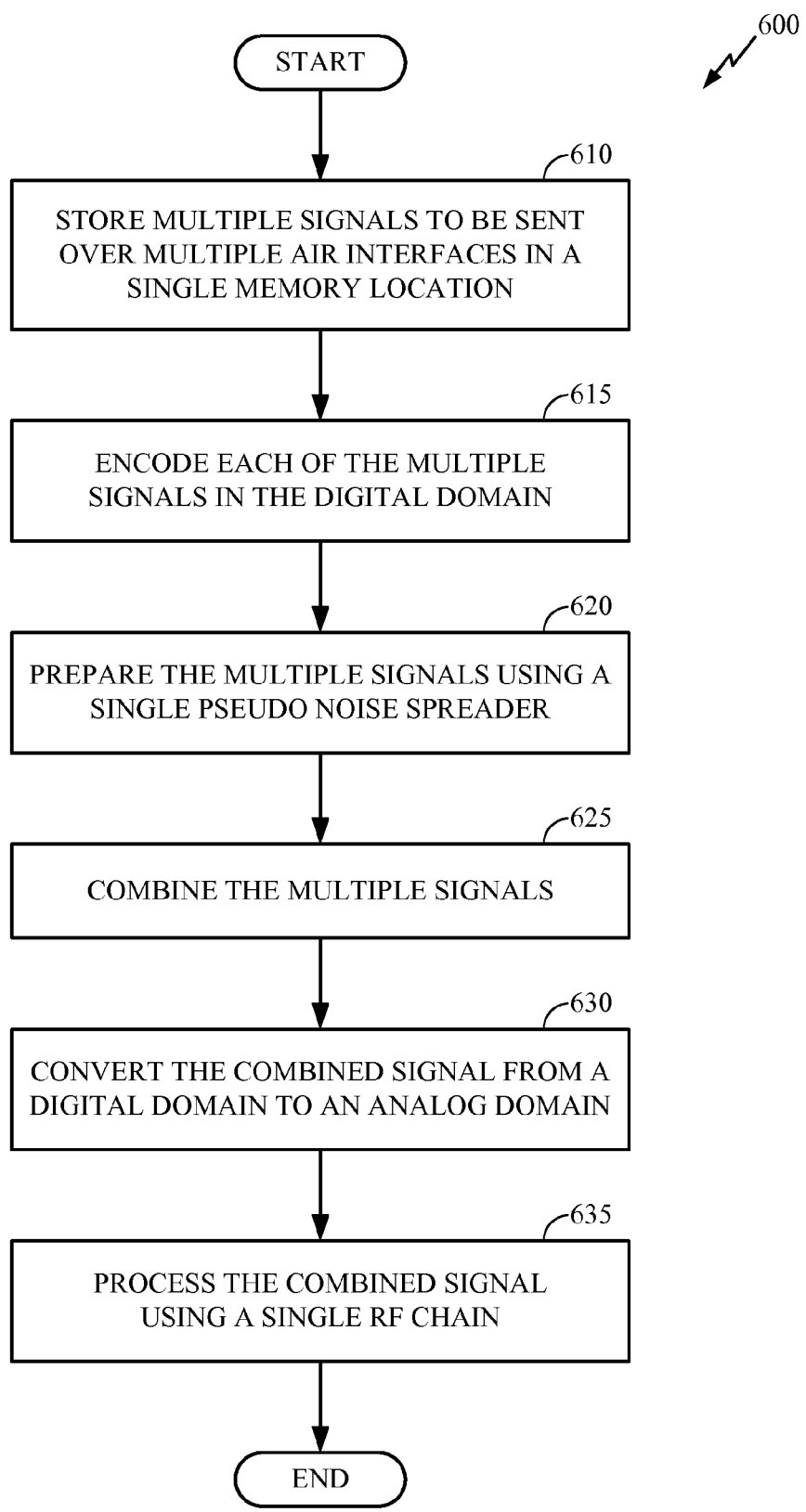
FIG. 6 illustrates an exemplary process of transmitting signals over multiple air interfaces using the transmitter as shown in FIG. 3.

FIG. 6 illustrates an exemplary process of transmitting signals over multiple air interfaces using the transmitter as shown in FIG. 3. The process 600 starts at a step 610 where the transmitter stores multiple signals to be sent over multiple air interfaces in a single memory location. Continuing at a step 615, the multiple signals are separately encoded in the digital domain by separate encoders. Further, at a step 620, a single PN spreader prepares the multiple signals for transmission. Next, at a step 625, the multiple signals are combined into a combined signal. At a further step 630, the combined signal is converted to the analog domain by a single DAC. At a next step 635, the combined signal is processed by a single RF chain and transmitted as a single combined signal.

Figure 7:
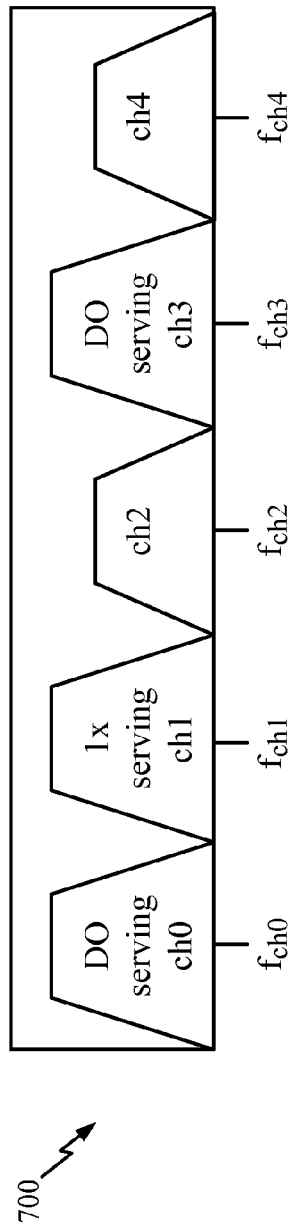
FIG. 7 illustrates an exemplary transmission of multiple (N) signals using one or more air interfaces.

FIG. 7 illustrates an exemplary transmission of multiple (N) signals using one or more air interfaces. The transmission 700 may comprise N frequency channels. Channel 0 has a carrier frequency of $f_{ch0}$, Channel 1 has a carrier frequency of $f_{ch1}$, and so on, and channel N has a carrier frequency of $f_{chN}$. The carrier frequencies are typically selected such that the channels are spaced sufficiently far apart to reduce inter-channel interference. In general, the carrier frequencies of the N channels may or may not be related to one another. The carrier frequency of each channel may be selected independently subject to a minimum inter-channel spacing criterion. The carrier frequencies may be evenly spaced across frequency and separated by a fixed frequency spacing $f_{spacing}$, which may be 1.2288 MHz or some other value. The N signals may carry any type of data for any service such as voice, video, packet data, text messaging, etc. The N signals may be received from one or multiple access points and may be received at different power levels or at the same power level (as shown in FIG. 7). For example, Channels 0 and 3 each use a DO air interface, while Channel 1 uses a 1xRTT air interface. The transmission may be generated by the transmitter 400 of FIG. 4, and received by the receiver 300 of FIG. 3, as described above.

Figure 8:
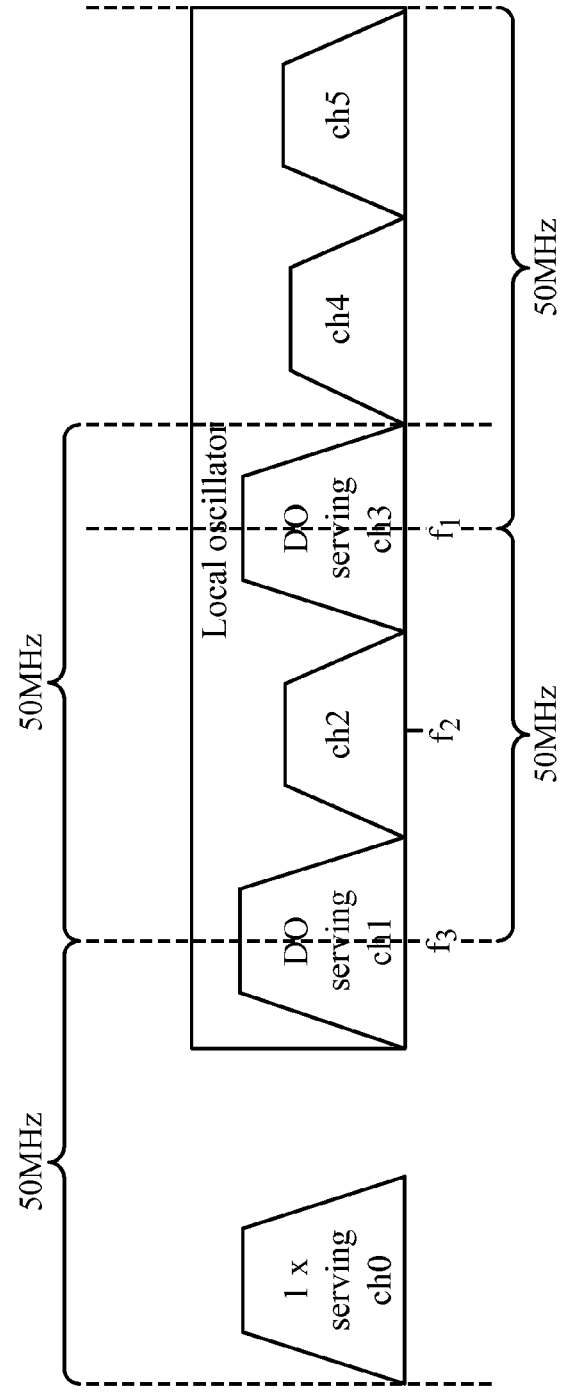
FIG. 8 illustrates encoding and/or decoding of an exemplary transmission of multiple (N) signals using one or more air interfaces.

Transceiver 260 may be configured for wideband communications. For example, transceiver 260 may be able to simultaneously transmit and/or receive (TX/RX) signals over a frequency range of 100 MHz as shown in FIG. 8. The frequency range may be dependent on the components used for the transceiver 260, such as the design of the ADC 350 and the DAC 420 of FIGS. 3 and 4. The exact frequency channels that the transceiver 260 may TX/RX signals over may be defined by the frequency range and a "center" frequency. The center frequency may be the center frequency of the frequency range over which the transceiver 260 TX/RX signals. For example, the transceiver 260 may TX/RX signals centered at a frequency of 100 MHz. The frequency range may be 50 MHz. Accordingly, the transceiver 260 may TX/RX signals between 75 MHz to 125 MHz. "Recentering" the transceiver 260 refers to choosing a new center frequency for the transceiver 260. The center frequency may be set by the mixer 330 of FIG. 3 for received signals, and the mixer 424 of FIG. 4 for transmitted signals.

Accordingly, transceiver 260 may TX/RX signals over channels 1, 2, 3, 4 and 5, when the transceiver is set to encode/decode signals centered at frequency $f_1$. As shown in FIG. 8, transceiver 260 simultaneously TXs/RXs DO signals over channels 1 and 3. However, to optimize the signal-to-intereference-plus-noise ratio (SINR) for each channel, transceiver 260 may be set or recentered to encode/decode signals centered at frequency $f_2$. In addition, transceiver 260 may need to TX/RX a signal over channel 0, but may not be able to TX/RX signals over channel 0 when centered at $f_1$ because it is outside of the 100 MHz frequency range ($f_1$−50 MHz to $f_1$+50 MHz). Accordingly, the transceiver 260 may be set or recentered to encode/decode signals centered at frequency $f_3$. The recentering of the transceiver 260 may cause data packet errors or loss of voice data. Accordingly, methods of recentering that minimize the impact on the signals transmitted and/or received are described herein.

Figure 9:
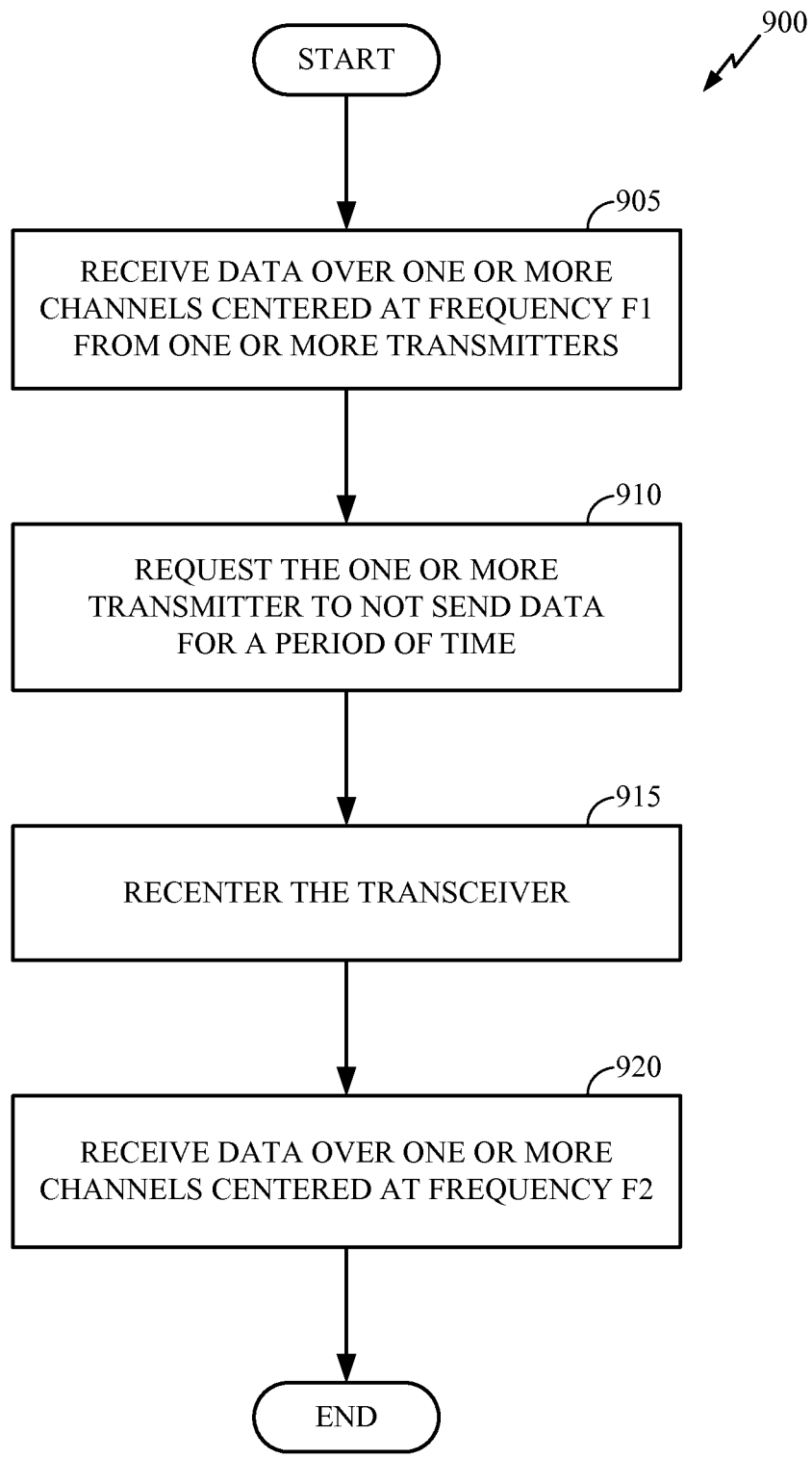
FIG. 9 is a flowchart of an exemplary process of recentering the transceiver shown in FIG. 2.

FIG. 9 is a flowchart of an exemplary process of "recentering" the transceiver shown in FIG. 2. The process 900 starts at a step 905 where the transceiver 260 receives data (e.g., voice communication and/or data only communication) over one or more channels using one or more air interfaces from one or more transmitters. The transceiver 260 is "centered" at a frequency F1. At a next step 910, the transceiver 260 transmits a message to each transmitter it is currently receiving data from, the message indicating for the one or more transmitters to stop transmitting for a period of time to the transceiver 260. Further at a step 915, the transceiver 260 recenters to a frequency F2 during the time period reserved. Continuing at a step 920, the transceiver 260, centered at the frequency F2, receives data over one or more channels using one or more air interfaces from one or more transmitters. Accordingly, no communication is lost during the recentering as no communication is sent to the transceiver 260 during the recentering period.

In another embodiment, the transceiver 260 may indicate in the message to stop transmitting at step 910. Further, at an optional step after step 915, the transceiver 260 may send another message to each of the one or more transmitters indicating for the one or more transmitters to resume transmitting to the transceiver 260.

In certain embodiments, recentering may or may not be performed based on certain criteria when not necessary to TX/RX a new channel. For example, wireless communication device 10 may evaluate the benefit of recentering the transceiver 260 in terms of SINR of each channel over which transceiver 260 TXs/RXs. The wireless communication device 10 may further evaluate throughput and voice quality versus the transient SINR dip from recentering.

One criterion may include determining in what format the data is being transmitted and/or received. For example, if the data is transmitted using a transmission control protocol (TCP), the wireless communication device 10 may not recenter the transceiver 260 since packet errors during TCP data transfers may cause throughput back off. If the data is transmitted using a user datagram protocol (UDP), the wireless communication device 10 may recenter the transceiver 260.

A second criterion may include determining if longer packet formats are being used for data being transmitted and/or received. If longer packet formats are being used, recentering the transceiver 260 may be performed as transient dips may have less of a probability of causing packet errors due to the time diversity of long packet formats.

A third criterion may include determining if the signals received over the one or more channels already have SINRs above a threshold. If the SINRs are above a threshold, the transceiver 260 may not be recentered as the appropriate SINR level is already attained.

A fourth criterion may include determining whether the residual side band (RSB) of a given signal can be reduced by recentering the transceiver 260. The RSB of each of the received signals is the reflection of the signal across the center frequency (e.g., the RSB of a signal received at center frequency+5 MHz will be centered at center frequency−5 MHz). For example, two signals may be received at the transceiver 260. Each of the signals may be received at a frequency equidistant from the center frequency and on opposite sides of the center frequency (e.g., center frequency±5 MHz). Accordingly, the RSB of each signal may interfere with the other received signal. Accordingly, the center frequency may be shifted (e.g., by 1.25 MHz) so that the RSBs of the received signals no longer interfere with the received signals. The amount to shift the center frequency may be calculated by scanning additional frequencies for additional signals and their RSBs to ensure that interference is reduced at that new center frequency. The transceiver 260 may incrementally search other frequency carriers (e.g., every 1 MHz).

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Figure 10:
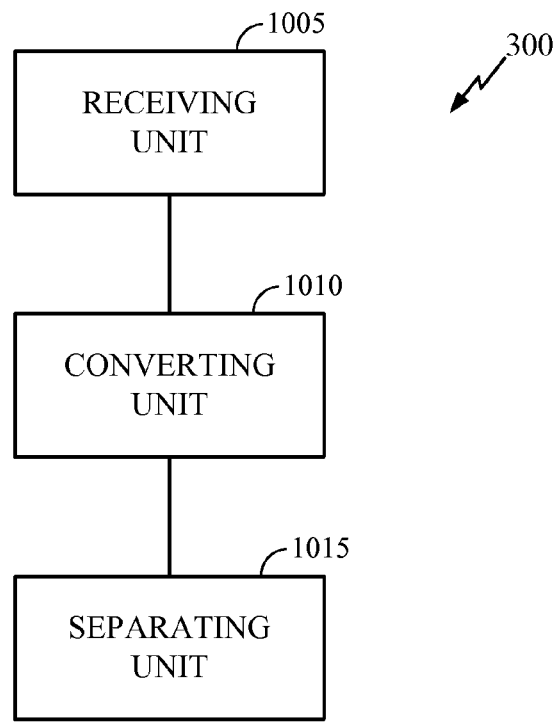
FIG. 10 is a functional block diagram of another exemplary receiver of a wireless communication device as shown in FIG. 2.
Figure 11:
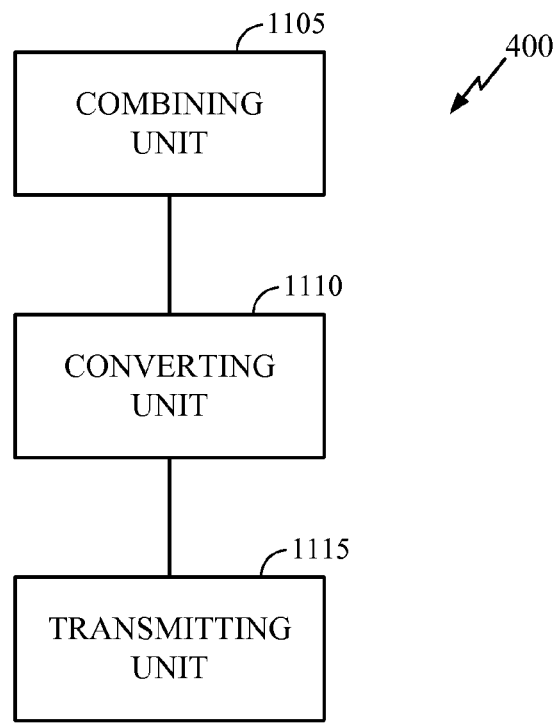
FIG. 11 is a functional block diagram of another exemplary transmitter of a wireless communication device as shown in FIG. 2.

The functionality described herein (e.g., with regard to one or more of the accompanying figures) may correspond in some aspects to similarly designated "means for" functionality in the appended claims. Referring to FIGS. 10 and 11, the receiver is represented as a series of interrelated functional modules.

FIG. 10 is a functional block diagram of another exemplary receiver of a wireless communication device as shown in FIG. 2. As shown, the receiver 300 may comprise a receiving unit 1005, a converting unit 1010, and a separating unit 1015. The receiving unit 1005 may correspond at least in some aspects to, for example, an antenna as discussed herein. The converting unit 1010 may correspond at least in some aspects to, for example, an ADC as discussed herein. The separation unit 1015 may correspond at least in some aspects to, for example, at least one rotator as discussed herein.

FIG. 11 is a functional block diagram of another exemplary transmitter of a wireless communication device as shown in FIG. 2. As shown, the transmitter 400 may comprise a combining unit 1105, a converting unit 1110, and a transmitting unit 1115. The combining unit 1105 may correspond at least in some aspects to, for example, a summer as discussed herein. The converting unit 1110 may correspond at least in some aspects to, for example, a DAC as discussed herein. The transmitting unit 1115 may correspond at least in some aspects to, for example, an antenna as discussed herein.

The functionality of the modules of FIGS. 10 and 11 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

While the specification describes particular examples of the present invention, those of ordinary skill can devise variations of the present invention without departing from the inventive concept. For example, the teachings herein refer to networks with femto cells and macro cells but are equally applicable to networks with other topologies.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP communication, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor may read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method comprising:
   receiving, at a receiver, a first input within a first frequency range centered at a first center frequency during a first time period, the first input comprising a first signal and a second signal, wherein the first signal is encoded using a first radio technology and the second signal is encoded using a second radio technology;
   separating the first input into the first signal and the second signal;
   transmitting a first message to a source of the first signal and the second signal, the first message indicative of a second time period during which the source is not to transmit to the receiver;
   recentering the receiver to receive a second input within a second frequency range centered at a second center frequency, wherein recentering the receiver is based on a set of criteria; and wherein the set of criteria comprises a first criterion, the first criterion corresponding to whether a signal-to-interference-plus-noise ratio (SINR) of the first signal received within the first frequency range is above a threshold SINR, a SINR of the second signal received within the first frequency range is above the threshold SINR, or a combination thereof;
   transmitting a second message to the source, the second message indicative of a third time period during which the source is to transmit to the receiver; and
   receiving, at the receiver from the source, the second input within the second frequency range during the third time period, wherein the third time period is after the second time period.

2. The method of claim 1, further comprising converting the first input via a single analog-to-digital converter.

3. The method of claim 1, wherein receiving the first input comprises receiving the first input via a single radio frequency (RF) chain.

4. The method of claim 3, further comprising processing the first signal using a first digital decoding path, and processing the second signal using a second digital decoding path.

5. The method of claim 4, wherein the first signal is centered at a first signal frequency and the second signal is centered at a second signal frequency, and wherein the first signal frequency and the second signal frequency are within the first frequency range.

6. The method of claim 4, further comprising decoding the first signal, the second signal, or a combination thereof.

7. The method of claim 4, further comprising searching for pilot signals on the first signal, the second signal, or a combination thereof.

8. The method of claim 4, further comprising determining a signal strength of the first signal, a signal strength of the second signal, or a combination thereof.

9. The method of claim 8, further comprising adjusting an amplification level of the first input based on the signal strength of the first signal, the signal strength of the second signal, or a combination thereof.

10. The method of claim 1, wherein the second input comprises a previous signal and a third signal, wherein the previous signal includes the first signal or the second signal, wherein the third signal is centered at a third signal frequency, wherein at least one of the first signal and the second signal is within the second frequency range, and wherein the third signal is within the second frequency range.

11. The method of claim 1, further comprising performing the recentering operation based on a signal strength of the first signal, a signal strength of the second signal, or a combination thereof.

12. The method of claim 1, wherein the set of criteria further comprises a second criterion, the second criterion corresponding to whether the received first signal complies with a protocol, whether the received second signal complies with the protocol, whether a signal to be transmitted complies with the protocol, or a combination thereof.

13. The method of claim 12, wherein the protocol is a user datagram protocol (UDP).

14. The method of claim 1, wherein the set of criteria further comprises a third criterion, the third criterion corresponding to whether the received first signal complies with a packet format, whether the received second signal complies with the packet format, whether a signal to be transmitted complies with the packet format, or a combination thereof.

15. The method of claim 1, wherein the first radio technology comprises a voice air interface and the second radio technology comprises a data only air interface.

16. The method of claim 1, wherein a standard, a packet format, a modulation scheme, or a combination thereof of the first radio technology is different than a corresponding standard, a corresponding packet format, a corresponding modulation scheme, or a combination thereof of the second radio technology.

17. The method of claim 1, wherein receiving the first input comprises receiving the first input at a mobile device from a base station.

18. A method comprising:
combining a first signal and a second signal, wherein the first signal is encoded using a first radio technology and the second signal is encoded using a second radio technology;
transmitting the combined signal to a receiver;
receiving, in response to a recentering operation that is performed based on a criterion corresponding to whether a signal-to-interference-plus-noise (SINR) of the first signal received over a first frequency range is above a threshold SINR, a SINR of the second signal received within the first frequency range is above the threshold SINR, or a combination thereof, a first message indicative of a first time period during which to refrain from transmitting to the receiver;
receiving a second message indicative of a second time period during which to transmit to the receiver; and
transmitting a second combined signal to the receiver during the second time period, wherein the second time period is after the first time period.

19. The method of claim 18, wherein the first radio technology comprises a voice air interface and the second radio technology comprises a data only air interface.

20. The method of claim 18, wherein encoding the first signal comprises encoding the first signal using a first digital encoding path and encoding the second signal comprises encoding the second signal using a second digital encoding path.

21. The method of claim 18, further comprising converting the combined signal via a single digital-to-analog converter.

22. The method of claim 18, further comprising processing the combined signal using a single RF chain.

23. A wireless apparatus comprising:
a summer configured to combine a first signal and a second signal, wherein the first signal is encoded using a first radio technology and the second signal is encoded using a second radio technology; and
a transceiver configured to:
transmit the combined signal to a receiver;
receive, in response to a recentering operation that is performed based on a criterion that corresponds to whether a signal-to-interference-plus-noise (SINR) of the first signal received over a first frequency range is above a threshold SINR, a SINR of the second signal received within the first frequency range is above the threshold SINR, or a combination thereof, a first message indicative of a first time period during which to refrain from transmitting to the receiver;
receive a second message indicative of a second time period during which to transmit to the receiver; and
transmit a second combined signal to the receiver during the second time period, wherein the second time period is after the first time period.

24. A wireless apparatus comprising:
means for receiving, wherein the means for receiving is configured to:
receive from a source a first input within a first frequency range centered at a first center frequency during a first time period, the first input comprising a first signal and a second signal, wherein the first signal is encoded using a first radio technology and the second signal is encoded using a second radio technology; and
receive from the source a second input within a second frequency range during a third time period and wherein the third time period is after a second time period;
means for separating the first input into the first signal and the second signal;
means for transmitting, wherein the means for transmitting is configured to:
transmit a first message to the source, the first message indicative of the second time period during which the source is not to transmit to the means for receiving; and
transmit a second message to the source, the second message indicative of the third time period during which the source is to transmit to the means for receiving; and
means for recentering the means for receiving to receive the second input within the second frequency range centered at a second center frequency, wherein recentering the means for receiving is based on a set of criteria; and
wherein the set of criteria comprises a first criterion, the first criterion corresponding to whether a signal-to-interference-plus-noise ratio (SINR) of the first signal received within the first frequency range is above a threshold SINR, a SINR of the second signal received within the first frequency range is above the threshold SINR, or a combination thereof.

25. A instructions that, when executed by a computer, cause the computer to
non-transitory computer-readable medium comprising:
combine a first signal and a second signal, wherein the first signal is encoded using a first radio technology and the second signal is encoded using a second radio technology;
transmit the combined signal to a receiver;
receive, in response to a recentering operation that is performed based on a criterion that corresponds to whether a signal-to-interference-plus-noise (SINR) of the first signal received over a first frequency range is above a threshold SINR, a SINR of the second signal received within the first frequency range is above the threshold SINR, or a combination thereof, a first message indicative of a first time period during which to refrain from transmitting to the receiver;
receive a second message indicative of a second time period during which to transmit to the receiver; and
transmit a second combined signal to the receiver during the second time period, wherein the second time period is after the first time period.

26. A method comprising:
receiving, at a receiver, a first input within a first frequency range centered at a first center frequency during a first time period, the first input comprising a first signal and a second signal, wherein the first signal is encoded using a first radio technology and the second signal is encoded using a second radio technology;
separating the first input into the first signal and the second signal;
transmitting a first message to a source of the first signal and the second signal, the first message indicative of a second time period during which the source is not to transmit to the receiver;
recentering the receiver to receive a second input within a second frequency range centered at a second center frequency, wherein recentering the receiver is based on a set of criteria, and wherein the set of criteria comprises a first criterion, the first criterion corresponding to whether a residual side band (RSB) of the first signal is likely to cause interference with the first signal, whether a RSB of the second signal is likely to cause interference with the second signal, or a combination thereof;
transmitting a second message to the source, the second message indicative of a third time period during which the source is to transmit to the receiver; and
receiving, at the receiver from the source, the second input within the second frequency range during the third time period, wherein the third time period is after the second time period.

27. A wireless apparatus comprising:

means for combining a first signal and a second signal, wherein the first signal is encoded using a first radio technology and the second signal is encoded using a second radio technology;

means for transmitting the combined signal to a receiver; and means for receiving a first message indicative of a first time period during which to refrain from transmitting to the receiver, the first message in response to a recentering operation that is performed based on a criterion that corresponds to whether a signal-to-interference-plus-noise (SINR) of the first signal received over a first frequency range is above a threshold SINR, a SINR of the second signal received within the first frequency range is above the threshold SINR, or a combination thereof, the means for receiving further for receiving a second message indicative of a second time period during which to transmit to the receiver; and the means for transmitting further for transmitting a second combined signal to the receiver during the second time period, wherein the second time period is after the first time period.

* * * * *